(12) United States Patent
Ji et al.

(10) Patent No.: US 11,557,887 B2
(45) Date of Patent: Jan. 17, 2023

(54) CABLE LAYING DEVICE

(71) Applicant: YANTAI JEREH PETROLEUM EQUIPMENT & TECHNOLOGIES CO., LTD., Yantai Shandong (CN)

(72) Inventors: Xiaolei Ji, Yantai Shandong (CN); Shouzhe Li, Yantai Shandong (CN); Yibo Jiang, Yantai Shandong (CN); Liang Lv, Yantai Shandong (CN); Sheng Chang, Yantai Shandong (CN); Shuzhen Cui, Yantai Shandong (CN); Jian Zhang, Yantai Shandong (CN)

(73) Assignee: YANTAI JEREH PETROLEUM EQUIPMENT & TECHNOLOGIES CO., LTD., Yantai Shandong (CN)

( * ) Notice: Subject to any disclaimer, the term of this patent is extended or adjusted under 35 U.S.C. 154(b) by 0 days.

(21) Appl. No.: 17/155,969

(22) Filed: Jan. 22, 2021

(65) Prior Publication Data
US 2022/0181859 A1 Jun. 9, 2022

(30) Foreign Application Priority Data

Dec. 8, 2020 (CN) .......................... 202011444292.X
Dec. 8, 2020 (CN) .......................... 202022978816.5

(51) Int. Cl.
*H02G 3/04* (2006.01)
*F16L 3/12* (2006.01)
(Continued)

(52) U.S. Cl.
CPC .......... *H02G 3/0456* (2013.01); *F16L 1/0246* (2013.01); *F16L 3/1226* (2013.01); *E21B 19/02* (2013.01); *H02G 3/06* (2013.01)

(58) Field of Classification Search
CPC ....... H02G 3/0456; H02G 3/06; F16L 1/0246; F16L 3/1226; E21B 19/02
See application file for complete search history.

(56) References Cited

U.S. PATENT DOCUMENTS 4,474,213 A * 10/1984 Jameson ................. E21B 43/26
137/615
7,418,812 B2 * 9/2008 Ikeda ..................... F16G 13/16
59/78.1
(Continued)

FOREIGN PATENT DOCUMENTS

CN        206051408 U      3/2017
CN        107257113 A     10/2017
(Continued)

OTHER PUBLICATIONS

International Search Report dated Aug. 30, 2021, for International Application No. PCT/CN2020/134404, 5 pages.

*Primary Examiner* — Nkeisha Smith
(74) *Attorney, Agent, or Firm* — Frost Brown Todd LLP

(57) ABSTRACT

The present application relates to a cable laying device. The cable laying device is used for transporting and laying a cable, and comprises:
  a base section and an extension section with adjustable length, wherein the extension section and the base section are connected to each other at their longitudinal ends and are moveable relative to each other,
  the base section is configured to include one elongated cable carrier, and the extension section is configured to include at least one elongated cable carrier, wherein
  for the base section and the extension section, the cable carrier a carrying portion for holding the cables, wherein the carrying portion enables the cables to move along with the cable carriers of the base section and the extension section, and wherein
  the height of the base section and/or the extension section can be adjusted.

20 Claims, 6 Drawing Sheets

(51) Int. Cl.
*F16L 1/024* (2006.01)
*H02G 3/06* (2006.01)
*E21B 19/02* (2006.01)

(56) References Cited

U.S. PATENT DOCUMENTS

| | | | | |
|---|---|---|---|---|
| 7,654,398 | B2* | 2/2010 | Bridges | H05K 7/1491 |
| | | | | 211/26 |
| 7,832,974 | B2* | 11/2010 | Fikowski | E21B 19/155 |
| | | | | 414/22.54 |
| 9,151,412 | B2* | 10/2015 | Trevithick | H02G 3/263 |
| 9,178,343 | B2* | 11/2015 | Brouwer | H02G 3/0443 |
| 9,617,796 | B2* | 4/2017 | Hall | E21B 15/003 |
| 2009/0200856 | A1* | 8/2009 | Chehade | E21B 7/02 |
| | | | | 299/30 |
| 2010/0006710 | A1* | 1/2010 | Lyness | H02G 3/0456 |
| | | | | 248/70 |
| 2013/0077219 | A1* | 3/2013 | Fu | H05K 7/1491 |
| | | | | 361/679.02 |
| 2013/0315676 | A1* | 11/2013 | Orgeron | E21B 15/003 |
| | | | | 405/184.4 |
| 2017/0317480 | A1* | 11/2017 | Rouleau | H02G 3/0608 |
| 2018/0309275 | A1* | 10/2018 | Winn | B21D 11/10 |
| 2019/0195316 | A1* | 6/2019 | Moritz | F16G 13/16 |
| 2021/0313784 | A1* | 10/2021 | Kellerman | F16L 3/26 |

FOREIGN PATENT DOCUMENTS

| | | |
|---|---|---|
| CN | 208399771 U | 1/2019 |
| CN | 208564627 U | 3/2019 |
| CN | 208707228 U | 4/2019 |
| CN | 208955593 U | 6/2019 |
| CN | 111884142 A | 11/2020 |
| KR | 102145604 B1 | 8/2020 |

* cited by examiner

CABLE LAYING DEVICE

FIELD

The present application relates to a power supply cable laying techniques in the application of large electrical equipment, and specifically to a cable laying device.

BACKGROUND

In oil field drilling, when the electrical equipment needs to be powered, it is often necessary for workers to manually drag the power supply cables to the electrical equipment. During a wellsite operation, many types of electrical equipment are required to operate at the same time. Under these circumstances, a lot of time should be spent on preparing power supply cables to the electrical equipment. When the operation is finished, the power supply cables also need to be collected. This process would incur much time and labor cost. Meanwhile, frequent drag of the power supply cables along the ground surface would cause certain wear to the power supply cables.

SUMMARY

An object of the present application is to provide a cable laying device, to solve or at least alleviate problems existing in the prior art.

According to the first aspect of the present application, there is provided a cable laying device for transporting and laying a cable, comprising:
a base section and an extension section with adjustable length, wherein the extension section and the base section are connected to each other at their longitudinal ends and are moveable relative to each other,
the base section is configured to include one elongated cable carrier, and the extension section is configured to include at least one elongated cable carrier, wherein
for the base section and the extension section, the cable carrier has a carrying portion for holding the cables, wherein the carrying portion enables the cables to move along with the cable carriers of the base section and the extension section, and wherein
the height of the base section and/or the extension section can be adjusted.

Optionally, in some embodiments of the present application, the cable carrier of the extension section and the cable carrier of the base section are rotationally connected relative to each other at longitudinal ends.

Optionally, in some embodiments of the present application, the cable carrier of the extension section is telescopically connected to the cable carrier of the base section, and the base section and the extension section can be adjusted in height.

Optionally, in some embodiments of the present application, the extension section comprises at least two elongated cable carriers which are rotationally connected relative to each other at longitudinal ends.

Optionally, in some embodiments of the present application, at least for the extension section, connecting portions are disposed at two longitudinal ends of the cable carrier, respectively, the cable carriers are connected via the connecting portions, and two said connecting portions extend oppositely in a direction perpendicular to the longitudinal axis of the cable carriers.

Optionally, in some embodiments of the present application, the cable laying device further comprises a lifting portion which is disposed at the cable carriers of the base section and/or the extension section and which can be controlled to adjust the height of the cable carriers.

Optionally, in some embodiments of the present application, the lifting portion comprises two sets of lifting elements respectively provided on both lateral sides of the cable carrier, wherein each set of lifting elements includes at least one hoisting hook or hoisting ring for adjusting the height of the cable carrier.

Optionally, in some embodiments of the present application, the lifting elements are distributed on both sides with respect to a middle axis of the cable carrier.

Optionally, in some embodiments of the present application, the extension section comprises at least two elongated cable carriers which are connected telescopically.

Optionally, in some embodiments of the present application, the cable laying device further comprises at least two lifting legs respectively supporting at the bottom of the base section and the extension section.

Optionally, in some embodiments of the present application, the cable laying device further comprises a moving mechanism, wherein the moving mechanism is disposed below the base section and configured to support the cable laying device when the lifting legs are not lifted.

Optionally, in some embodiments of the present application, the extension section is sleeved in the base section, a slide rail for the extension section is longitudinally disposed in the base section, wherein the extension section performs telescopic movement along the slide rail.

Optionally, in some embodiments of the present application, the carrying portion is configured to include a drag chain in which the cables are wrapped and accommodated.

Optionally, in some embodiments of the present application, the carrying portion is configured to include a limiting element disposed in the cable carrier and configured to fix the cables.

Optionally, in some embodiments of the present application, the limiting element includes a longitudinal limiting portion which is configured to include at least one longitudinal limiting groove longitudinally disposed in the cable carrier, and accommodate the cables therein.

Optionally, in some embodiments of the present application, the limiting element includes a transverse limiting portion, which is configured to include at least one transverse limiting bar transversely disposed in the cable carrier, wherein the cables are blocked inside the transverse limiting bar.

Optionally, in some embodiments of the present application, for the base section and the extension section, one or more cable clamps may also be disposed transversely outside the cable carriers, so as to store cable connectors.

Optionally, in some embodiments of the present application, the cable laying device further comprises a cable connecting mechanism, wherein the cable connecting mechanism connects the cables of the base section and the cables of the extension section with an electrical equipment at the longitudinal ends, or connects the cables of the extension section with the electrical equipment at the longitudinal ends, or connects the cables of the base section or extension section with the electrical equipment at the longitudinal ends.

Optionally, in some embodiments of the present application, the cable connecting mechanism comprises a connecting element provided at the longitudinal ends of the cables of the cable carriers.

Optionally, in some embodiments of the present application, the connecting element is configured as a snap element, wherein the cables are connected with each other in a snap connection manner.

BRIEF DESCRIPTION OF THE DRAWINGS

Reference may be made to preferred embodiments shown in the figures to enable better understanding of the above and other objects, features, advantages and functions of the present application. The same reference numerals in the figures denote the same parts. Those skilled in the art should appreciate that the figures are intended to schematically illustrate the preferred embodiments of the present application, and not intended to impose any limitations to the scope of the present application. Wherein, FIG. 1 exemplarily shows a cable laying device according to an embodiment of the present application.

LISTING OF REFERENCE NUMBERS

Figure 1:
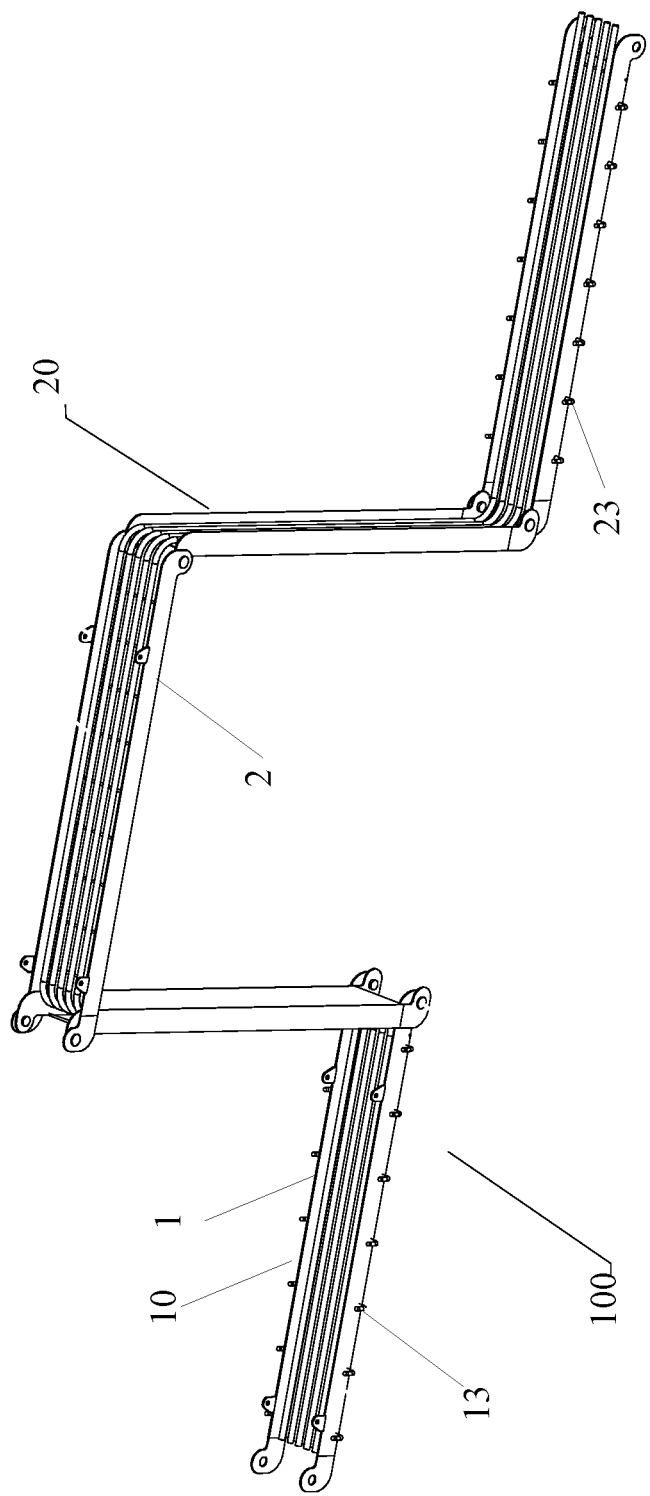

100 Cable laying device
10 Base section
20 Extension section
1, 2 cable carrier
13, 23 Cable clamp
21 Connecting portion
22 Carrying portion
221 Longitudinal limiting portion
222 Transverse limiting portion
31 Lifting portion
30 Lifting leg
40 Moving mechanism.

DETAILED DESCRIPTION OF EMBODIMENTS

Specific embodiments of the present application will now be described in detail with reference to the figures. The embodiments described herein are only preferred embodiments according to the present application. Those skilled in the art can envision other modes capable of implementing the present application on the basis of the preferred embodiments, and said other modes also fall within the scope of the present application.

The cable laying device as disclosed can be used to transport and lay cables, and can particularly reduce the labor cost of transporting and laying cables during oil field operations. Referring to FIG. 1 through FIG. 6, the cable laying device 100 includes: a base section 10 and a length adjustable extension section 20, wherein the extension section 20 and the base section 10 are connected to each other at their longitudinal ends and are moveable relative to each other. In the scope of the present application, the base section 10 refers to a minimum laying unit of the cable laying device 100, and depending on the use occasion, the extension section 20 of different lengths may be used to connect with the base section 10 so as to meet different laying requirements. Specifically, the base section 10 may be configured to include one elongated cable carrier 1, and the extension section 20 may be configured to include at least one elongated cable carrier 2. The present application mainly proposes a device capable of mechanically and automatically transporting and layering cables, hence any shape of the elongated cable carriers that can hold, transport and lay cables all fall within the protection scope of the present application.

Furthermore, for the base section 10 and the extension section 20, the cable carriers 1 and 2 are provided with a carrying portion 22 for holding the cables, which enables the cables to follow movement of the base section 10 and the extension section 20 by accommodating and arranging the cables. In addition, the carrying portion 22 can accommodate the cable therein and protect the cable from being damaged by direct contact with external objects (for example, when the cables are dragged directly on the ground) during laying or storage.

Further, in order to enable the cable laying device 100 to more conveniently lay the cables in different space fields, the height of the base section 10 and/or the extension section 20 can be adjusted. In order to realize the height adjustment of the base section 10 and/or the extension section 20, the cable laying device 100 may be equipped with different height adjustment drive mechanisms, such as hydraulic, electric or other driving mechanisms. Correspondingly, a corresponding height-adjusting element may also be provided at the base section 10 or the extension section 20, so that the height adjustment driving mechanism can drive the height-adjusting element, thereby realizing the function of adjusting the height of the base section 10 and the extension section 20. For example, a hoisting ring or hook may be provided at the cable carriers of the base section 10 and/or the extension section 20, and can be driven by a crane or the like to drive the cable carriers to different heights. Other types of height-adjusting elements are also feasible, as long as they can achieve the corresponding functions.

In the cable laying device disclosed in the present application, it is realized that when laying the cables, the extension section 20 can be extended to different degrees according to a desired cable length, meanwhile, the height of the base section 10 or the extension section 20 can be adjusted according to a desired laying height.

In the cable laying device 100 disclosed in the present application, the extension section 20 may be extended from the base section 10 in a variety of ways, such as a telescopic structure or a rotational and foldable connection structure. Specifically, referring to FIGS. 1 to 4 showing an embodiment of the present application, the connection between the base section 10 and the extension section 20 is achieved in a way that their respective cable carriers are rotatable relative to each other at the longitudinal ends. That is, the two cable carriers of the base section 10 and extension section 20 are connected such that they are rotatable relative to each other in any direction within the space depending on the needs of cable-laying operation. Any suitable technical means in the prior art may be applied to achieve such a connection effect, for example, a ball articulation structure or a gimbal-like connection mechanism or other connection manners may be disposed at the longitudinal ends of the cable carriers of the base section 10 and the extension section 20, so long as they can achieve the corresponding function.

Optionally, in some embodiments of the present application, the two cable carriers 1, 2 of the base section 10 and the extension section 20 are connected at their longitudinal ends in a pivotal connection manner, so that the base section 10 and the extension section 20 are rotatable, in 360 degrees, relative to each other in a vertical plane perpendicular to the longitudinal axes of the cable carriers. Particularly, they can be fully unfolded and extended 180 degrees on a plane, or can be extended at a certain angle to each other, or even can be stacked together overlapping with each other, as shown in FIG. 3 and FIG. 4.

Figure 3:
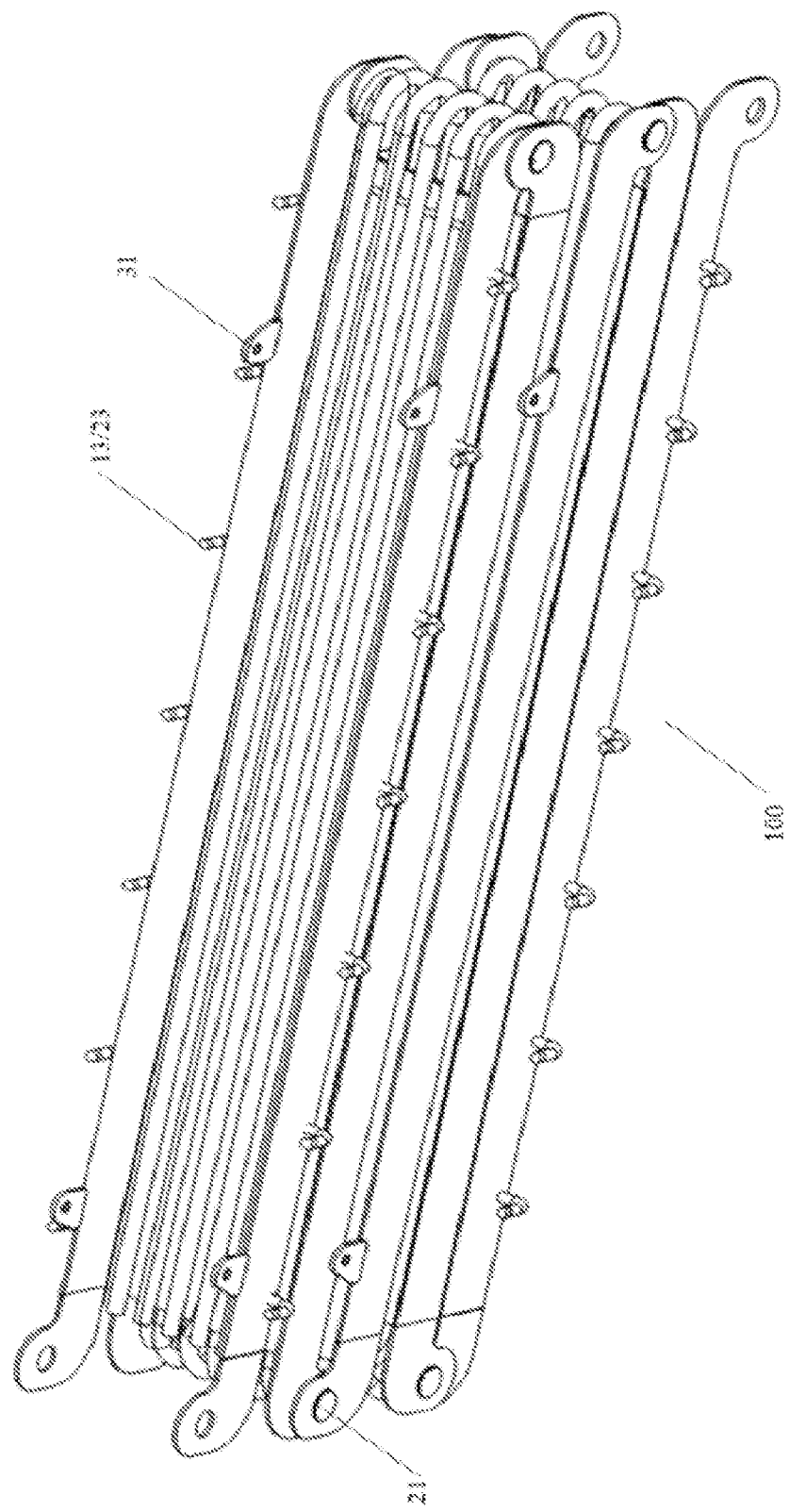
FIG. 3 exemplarily shows a stacked state of the cable laying device disclosed in FIG. 1.
Figure 4:
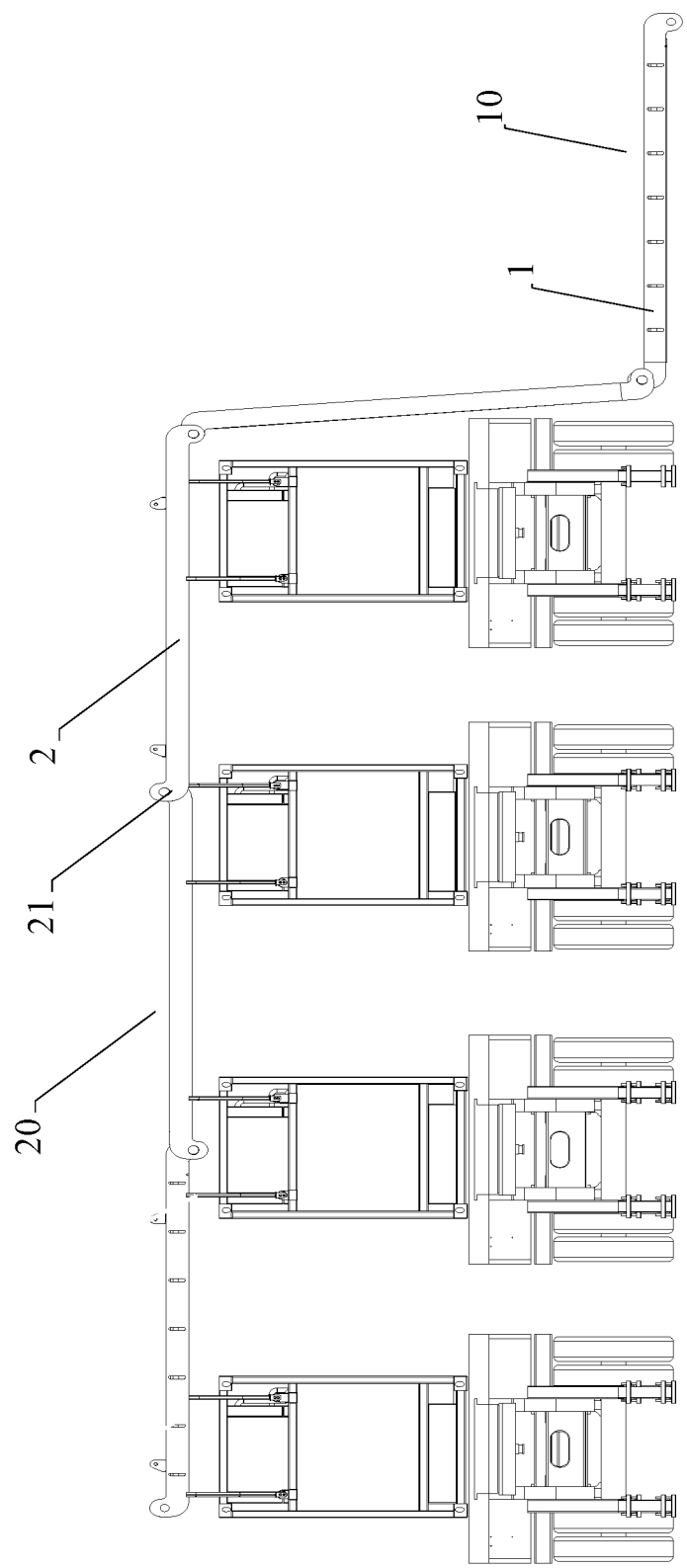
FIG. 4 exemplarily shows an in-use state of the cable laying device disclosed in FIG. 1.

FIG. 3 and FIG. 4 exemplarily show a pivotal connection state between the cable carriers of the base section 10 and the extension section 20. FIG. 3 shows a state in which the cable carriers are stacked together. FIG. 4 shows that the cable carriers in the cable laying device 100 are at different rotation angles relative to each other, wherein a middle cable carrier may be hoisted by a hoisting device. In order to support the cable carriers in the air more stably, it is also possible to use supporting devices to support the suspended cable trays in some use occasions.

Figure 5:
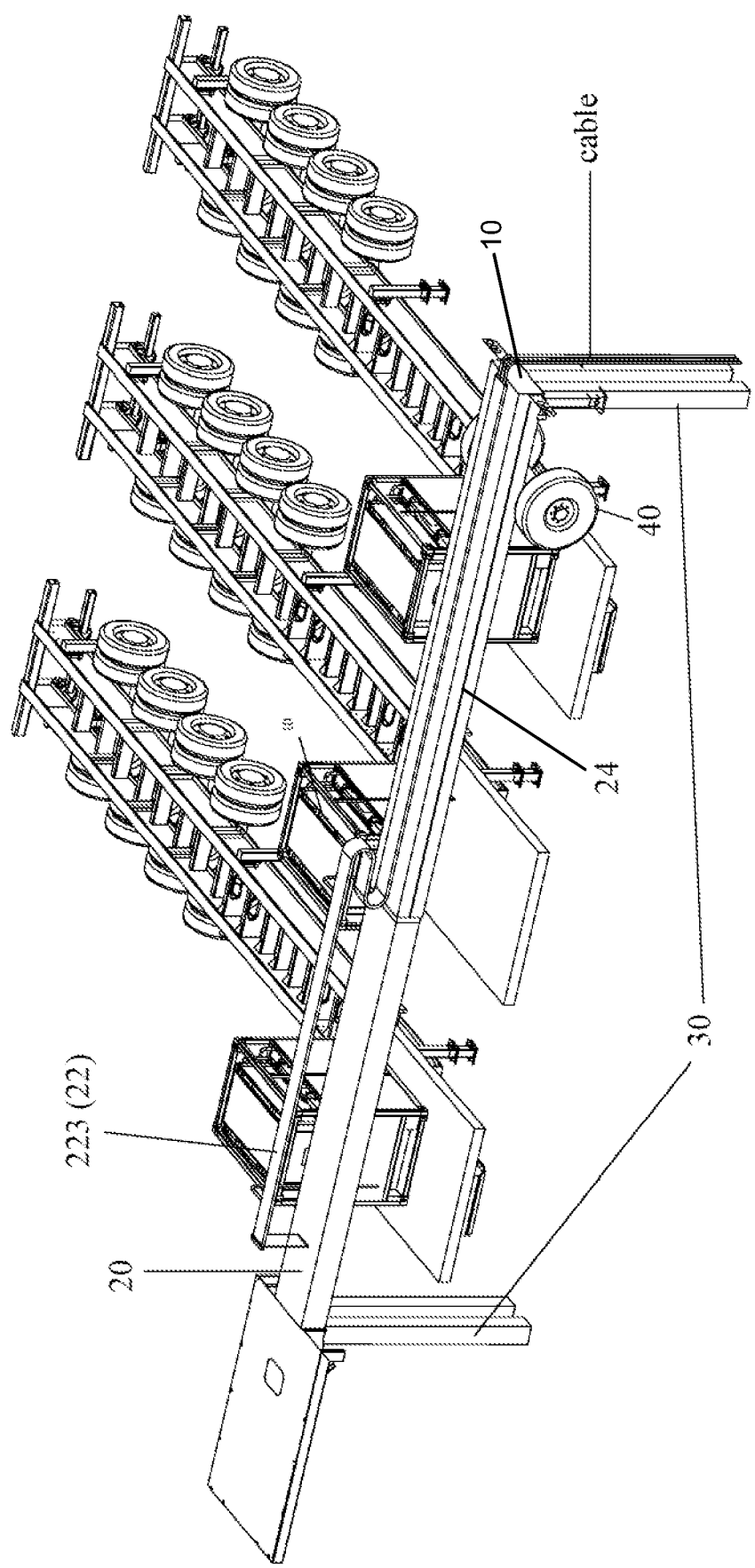
FIG. 5 exemplarily shows a cable laying device according to another embodiment of the present application, wherein the cable laying device is in in-use state.
Figure 6:
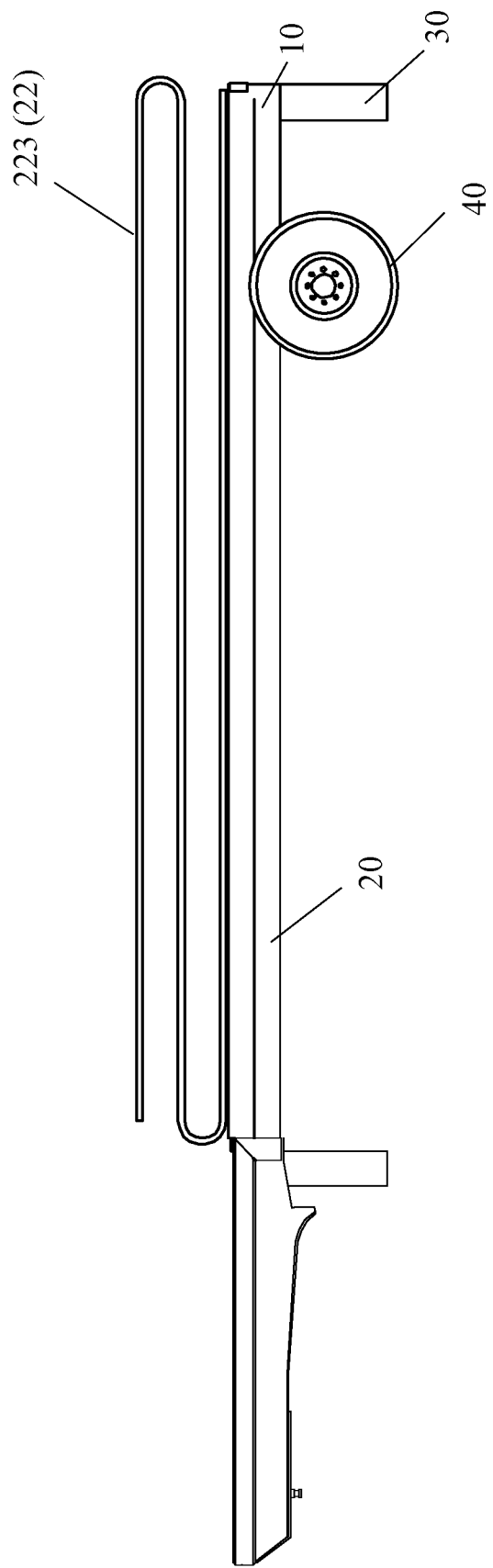
FIG. 6 exemplarily shows the cable laying device disclosed in FIG. 5 in an unused state.

In addition, referring to FIG. 5 and FIG. 6, another mode of connection between the base section 10 and the extension section 20 is shown. Specifically, the cable carrier of the extension section 20 is telescopically connected to the cable carrier of the base section 10, that is, the entire cable carrier of the extension section 20 can move telescopically relative to the cable carrier of the base section 10. In this condition, in order to improve the compatibility and flexibility of this connection mode with the cables laying requirements, both the base section 10 and the extension section 20 can be adjusted to different heights. Specifically, for example, the cable carrier of the base section 10 can be provided with a slide rail 24 for the cable carrier of the extension section 20 so that the cable carrier of the extension section 20 is longitudinally telescopic relative to the base section 10 along the slide rail 24. To achieve the height-adjusting function of both the base section 10 and the extension section 20, the cable laying device 100 can be configured to include lifting legs 30 respectively provided at the bottom of the base section 10 and the extension section 20, and the lifting legs 30 can drive the base section 10 and the extension section 20 to perform the lifting movement.

Optionally, in order to simultaneously realize the length and height adjustment requirements of the cable laying device 100 during the operation, the cable laying device 100 may further include a moving mechanism 40, wherein the moving mechanism 40 is mounted at the lower end of the base section 10 to support the base section 10. Preferably, the height of the moving mechanism 40 is set to be higher than that of the lifting legs 30 without extension, (as shown in FIG. 6). In this condition, when laying cables, it can be realized that in the case where the moving mechanism supports the base section 10, the extension section 20 can be first extended from the base section 10, and after the extension section 20 being extended to a specified length, the lifting legs 30 respectively disposed at the bottom of the base section 10 and extension section 20 then adjust the base section 10 and extension section 20 to a desired height, as shown in FIG. 5.

Figure 2:
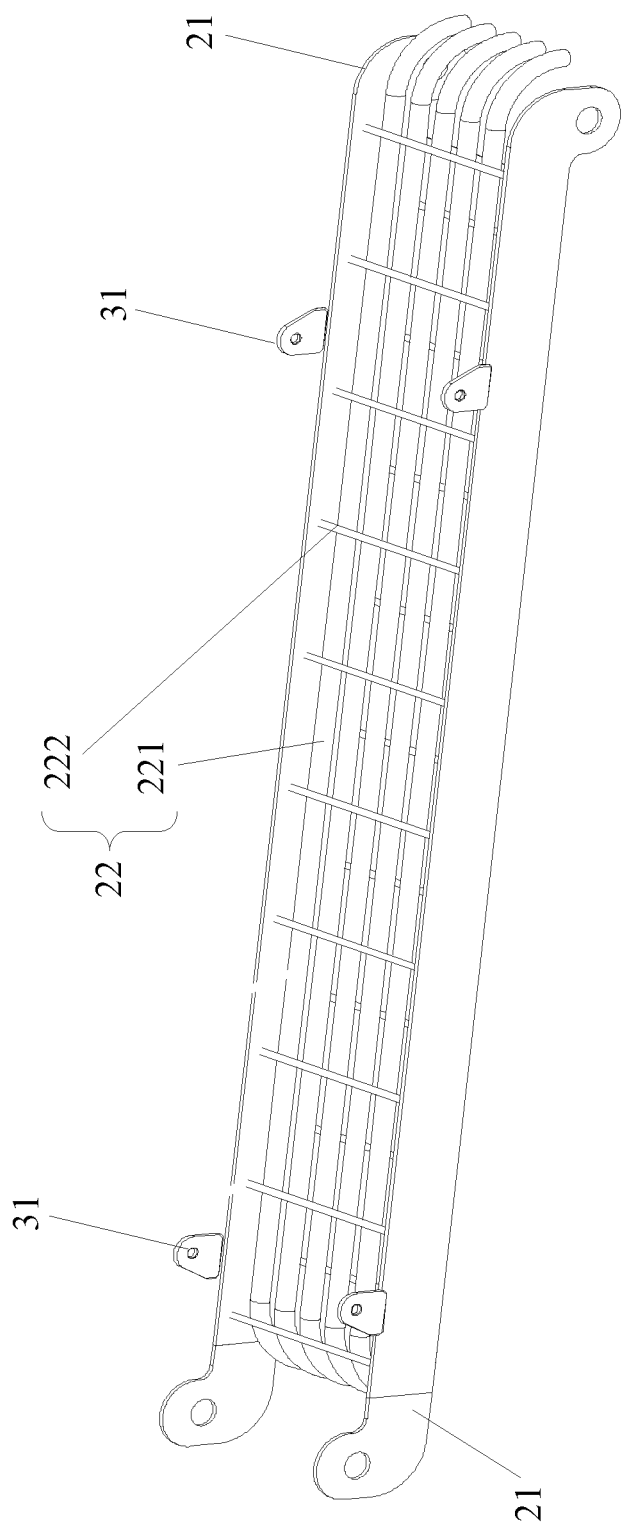
FIG. 2 exemplarily shows a cable carrier of the cable laying device according to an embodiment of the present application.

Optionally, referring to FIG. 2, in the cable laying device 100 disclosed in the present application, for the extension section 20 containing two or more cable carriers, the cable carriers 2 in the extension section 20 can be connected rotationally relative to each other at their longitudinal ends as stated above, or the cable carriers 2 in the extension section 20 may also be telescopically connected as stated above. When the cable carriers 2 in the extension section 20 are connected rotationally with each other, to facilitate the stacking of multiple cable carriers, connecting portions 21, where the cable carrier is rotationally connected with other cable carriers, may be configured as: two connecting portions 21 at the longitudinal ends of the cable carrier extend oppositely in a direction perpendicular to a longitudinal axis of the cable carriers, as shown in FIG. 1 to FIG. 4. Specifically, the connecting portions 21 may be configured to extend in opposite directions with respect to the cable carrier 2, for example, the connecting portion 21 at one longitudinal end is configured to extend arcuately upwardly relative to the cable carrier 2, and the connecting portion 21 at the other longitudinal end is configured to extend arcuately downwardly relative to the cable carrier 2.

Optionally, referring to FIG. 5, in some embodiments of the present application, the carrying portion 22 may include a drag chain 223, and the cables are wrapped inside the drag chain 223. Here, the chain is flexible, and can curve along with the cable carriers 1 and 2 while protecting the cable therein. Alternatively, as shown in FIG. 2, in some embodiments of the present application, the carrying portion 22 may be directly configured in the cable carriers 1, 2, for example, configured as a limiting element disposed in the cable carriers 1, 2 capable of accommodating and maintaining the positions of the cables. For example, the limiting element includes a longitudinal limiting portion 221 and/or a transverse limiting portion 222. Here, the longitudinal limiting portion 221 is configured to include at least one longitudinal limiting groove longitudinally disposed in the cable carriers 1, 2, wherein the groove formed by the limiting groove accommodates the cables. The transverse limiting portion 222 may be configured to include at least one transverse limiting bars transversely disposed in the cable carrier, wherein the cables are blocked inside the transverse limiting bars without protruding beyond the cable carriers 1, 2 due to drag. In addition, the limiting element may also be configured as for example a limiting post, a limiting cover plate, or the like. Other limiting elements that can achieve the same function also fall within the scope of the present application.

Optionally, as can be seen from FIG. 1 to FIG. 4, in some embodiments of the present application, one or more cable clamps 13, 23, such as longitudinally-distributed limiting bars, may further be disposed outside with respect to transverse direction of the cable carriers 1, 2, and can be used to store cable connectors.

Optionally, as can be seen from FIG. 1 to FIG. 4, the cable laying device 100 may further include a lifting portion 31 disposed at the cable carriers of the base section and/or the extension section to assist the cable carrier for lifting movement. Depending on the shape and design of the cable carrier, the lifting portion 31 can exist at the cable carrier in different forms. As shown, the lifting portion 31 may be configured to include two sets of lifting elements respectively provided on both lateral sides of the cable carrier. In the scope of the present application, "transverse" and "lateral" refers to a direction perpendicular or approximately perpendicular to the extending direction of the cables arranged in the cable carrier, and correspondingly, "longitudinal" refers to a direction that coincides or approximately coincides with the extending direction of the cables arranged in the cable carrier 1. For the two sets of lifting elements, each set of lifting elements includes at least one hoisting hook or hoisting ring for adjusting the height of the cable carrier. Optionally, the lifting elements are distributed on both longitudinal sides with respect to a middle axis of the cable carrier. In other words, the hoisting hooks or hoisting rings in each set of lifting elements are distributed in the longitudinal direction of the cable carrier. The "middle axis" refers to a longitudinal middle of the cable carrier. Some driving mechanism, such as cranes, can lift the cable carrier by pulling on the hoisting hook or hoisting loop of the cable carrier.

Optionally, the cable laying device disclosed in the present application may further include a cable connecting mechanism, which connects the cables of the base section and the cables of the extension section with the electrical equipment at the longitudinal ends, or connects the cables of the extension section with the electrical equipment at the longitudinal end, or connects the cables of the base section or extension section with the electrical equipment at the longitudinal end. For example, the cable connecting mechanism includes a connecting element provided at the longitudinal end of the cables of the cable carrier. It is conceivable that the connecting element is configured as a snap element, wherein the cables are connected together in a snap connection manner.

The above depictions of various embodiments of the present application are provided to those having ordinary skill in the art for depiction purpose, and are not intended to exclude other embodiments from the present application or limit the present application to a single disclosed embodiment. As described above, various alternatives and modifications of the present application will be apparent to those of ordinary skill in the art. Accordingly, although some alternative embodiments have been described in detail, those having ordinary skill in the art will understand or readily develop other embodiments. The application is intended to cover all alternatives, modifications and variations of the present application described herein, as well as other embodiments falling within the spirit and scope of the present application described herein.

We claim:

1. A cable laying device (100) for transporting and laying cables, wherein the device comprises:
   a base section (10) and an extension section (20) with adjustable length, wherein the extension section (20) and the base section (10) are connected to each other at their longitudinal ends and are moveable relative to each other,
   the base section (10) is configured to include one elongated cable carrier (1), and the extension section (20) is configured to include at least one elongated cable carrier (2), wherein
   for the base section (10) and the extension section (20), the cable carrier (1, 2) has a carrying portion (22) for holding the cables, wherein the carrying portion (22) enables the cables to move along with the cable carriers (1, 2) of the base section (10) and the extension section (20), and wherein
   the height of the base section (10) and/or the extension section (20) can be adjusted;
   wherein the cable carrier (2) of the extension section (20) and the cable carrier (1) of the base section (10) are rotationally connected relative to each other at longitudinal ends;
   wherein the extension section (20) comprises at least two elongated cable carriers (2) which are rotationally connected relative to each other at longitudinal ends;
   wherein at least for the extension section (20), connecting portions (21) are disposed at two longitudinal ends of the cable carrier (2), respectively, the cable carriers (2) are connected via the connecting portions (21), and two said connecting portions (21) extend oppositely in a direction perpendicular to a longitudinal axis of the cable carriers (2).

2. The cable laying device (100) according to claim 1, wherein the cable laying device further comprises a lifting portion (31) which is disposed at the cable carriers (1, 2) of the base section and/or the extension section and which can be controlled to adjust the height of the cable carriers (1, 2).

3. The cable laying device (100) according to claim 2, wherein the lifting portion (31) comprises two sets of lifting elements respectively provided on both lateral sides of the cable carrier (1, 2), wherein each set of lifting elements includes at least one hoisting hook or hoisting ring for adjusting the height of the cable carrier (1, 2).

4. The cable laying device (100) according to claim 3, wherein the lifting elements are distributed on both sides with respect to a middle axis of the cable carrier (1, 2).

5. The cable laying device (100) according to claim 1, wherein the carrying portion (22) of the cable carrier (1, 2) of each of the base section (10) and the extension section (20) is configured to include a drag chain (223) in which the cables are wrapped and accommodated.

6. The cable laying device (100) according to claim 1, wherein the carrying portion (22) of the cable carrier (1, 2) of each of the base section (10) and the extension section (20) is configured to include a limiting element disposed in the cable carrier (1, 2) and configured to fix the cables.

7. The cable laying device (100) according to claim 6, wherein the limiting element includes a longitudinal limiting portion (221), which is configured to include at least one longitudinal limiting groove longitudinally disposed in the cable carrier (1, 2), in which the cables are accommodated.

8. The cable laying device (100) according to claim 6, wherein the limiting element includes a transverse limiting portion (222), which is configured to include at least one transverse limiting bar transversely disposed in the cable carrier (1, 2), wherein the cables are blocked inside the transverse limiting bar.

9. The cable laying device (100) according to claim 1, wherein the cable laying device further (100) comprises a cable connecting mechanism, wherein the cable connecting mechanism connects cables of the base section and cables of the extension section with an electrical equipment at the longitudinal ends, or connects the cables of the extension section with the electrical equipment at the longitudinal ends, or connects the cables of the base section or extension section with the electrical equipment at the longitudinal ends.

10. The cable laying device (100) according to claim 9, wherein the cable connecting mechanism comprises a connecting element provided at the longitudinal ends of the cables of the cable carriers (1, 2).

11. A cable laying device (100) for transporting and laying cables, wherein the device comprises:
   a base section (10) and an extension section (20) with adjustable length, wherein the extension section (20) and the base section (10) are connected to each other at their longitudinal ends and are moveable relative to each other,
   the base section (10) is configured to include one elongated cable carrier (1), and the extension section (20) is configured to include at least one elongated cable carrier (2), wherein
   for the base section (10) and the extension section (20), the cable carrier (1, 2) has a carrying portion (22) for holding the cables, wherein the carrying portion (22)

enables the cables to move along with the cable carriers (1, 2) of the base section (10) and the extension section (20), and wherein the cable carrier (2) of the extension section (20) is telescopically connected to the cable carrier (1) of the base section (10), and the base section (10) and the extension section (20) can be adjusted in height;

wherein the extension section (20) comprises at least two elongated cable carriers (2) which are connected telescopically.

12. The cable laying device (100) according to claim 11, wherein the cable laying device (100) further comprises at least two lifting legs (30) respectively supporting at a bottom of the base section (10) and the extension section (20).

13. The cable laying device (100) according to claim 12, wherein the cable laying device (100) further comprises a moving mechanism (40), wherein the moving mechanism (40) is disposed below the base section (10) and configured to support the cable laying device (100) when the lifting legs (30) are not lifted.

14. The cable laying device (100) according to claim 13, wherein the extension section (20) is sleeved in the base section (10), a slide rail (24) for the extension section (20) is longitudinally disposed in the base section (10), wherein the extension section (20) performs telescopic movement along the slide rail (24).

15. The cable laying device (100) according to claim 11, wherein the carrying portion (22) of the cable carrier (1, 2) of each of the base section (10) and the extension section (20) is configured to include a drag chain (223) in which the cables are wrapped and accommodated.

16. The cable laying device (100) according to claim 11, wherein the carrying portion (22) of the cable carrier (1, 2) of each of the base section (10) and the extension section (20) is configured to include a limiting element disposed in the cable carrier (1, 2) and configured to fix the cables.

17. The cable laying device (100) according to claim 16, wherein the limiting element includes a longitudinal limiting portion (221), which is configured to include at least one longitudinal limiting groove longitudinally disposed in the cable carrier (1, 2), in which the cables are accommodated.

18. The cable laying device (100) according to claim 16, wherein the limiting element includes a transverse limiting portion (222), which is configured to include at least one transverse limiting bar transversely disposed in the cable carrier (1, 2), wherein the cables are blocked inside the transverse limiting bar.

19. The cable laying device (100) according to claim 11, wherein the cable laying device further (100) comprises a cable connecting mechanism, wherein the cable connecting mechanism connects cables of the base section and cables of the extension section with an electrical equipment at the longitudinal ends, or connects the cables of the extension section with the electrical equipment at the longitudinal ends, or connects the cables of the base section or extension section with the electrical equipment at the longitudinal ends.

20. The cable laying device (100) according to claim 11, wherein the cable connecting mechanism comprises a connecting element provided at the longitudinal ends of the cables of the cable carriers (1, 2).

* * * * *